United States Patent Office 3,400,063
Patented Sept. 3, 1968

3,400,063
TWO-STAGE ELECTROLYTIC PROCESS FOR PREPARING HIGH-CONCENTRATION SODIUM CHLORATE SOLUTIONS
Gabriel Boutillon, Sainte-Foy-les-Lyon, France, assignor to Societe d'Electro-Chimie, d'Electro-Metallurgie et des Acieries Electriques d'Ugine, Paris, France, a corporation of France
No Drawing. Filed Dec. 20, 1963, Ser. No. 332,254
Claims priority, application France, Dec. 22, 1962, 919,581
7 Claims. (Cl. 204—95)

ABSTRACT OF THE DISCLOSURE

A two-stage electrolytic process for preparing a sodium chlorate solution suitable for use in the sulfur dioxide manufacture of chlorine dioxide. Sodium chloride is electrolyzed in two stages. A sodium chloride solution having a concentration of at least 280 g./l. is electrolyzed to a concentration of 170 to 120 g./l. using an anode of magnetite or graphite. In the second stage the solution is electrolyzed to a concentration of 3 to 10% sodium chlorate using an anode of platinum or platinized metal. No between-stage crystallizations are necessary and no HCl is used. The resulting sodium chlorate solution is of a high sodium chlorate concentration and a low sodium chloride concentration and is therefore especially useful for manufacturing chlorine dioxide since very little chlorine is then produced in the manufacturing process.

This invention relates to improvements in the manufacture of chlorine dioxide, and more particularly to a process for the production of concentrated sodium chlorate solutions used in preparation of chlorine dioxide.

It is known to prepare chlorine dioxide by reducing a chlorate solution acidified by a halogen free mineral acid with $SO_2$ according to the summary reaction:

(I) $\quad 2NaClO_3 + SO_2 \rightarrow 2ClO_2 + Na_2SO_4$

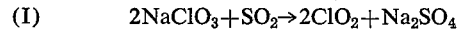

The chlorate solution is usually prepared by dissolving in water crystallized sodium chlorate. It is also known that the addition of a small quantity of NaCl, about 5% by weight of NaCl compared to the chlorate, to the chlorate solution improves the $ClO_2$ output, in comparison to the chlorate used. As a matter of fact, if the starting solution does not contain the sodium chloride which is necessary in some of the successive elementary reactions summarized by the reaction (I), this chloride is formed preferentially to the chlorate; therefore, it is economical to introduce this chloride into the starting solution, preferably as a crystallized salt. Such an introduction of chloride does not increase greatly the chlorine content of the evolved gas which chlorine content does not exceed 5% to 6% by volume of the $ClO_2$.

It is profitable to introduce into a $ClO_2$ reactor, solutions as concentrated as possible in order to minimize the quantity of water with the reagents. In fact, the solution which becomes progressively weaker in chlorate also becomes gradually too diluted in chlorate, and, to allow a sufficient speed of the formation of the $ClO_2$, it is then necessary to remove the residuary solution which carries away a portion of the mineral acid and of the starting chlorate. The quantity of water to be removed, and therefore the reagent losses, are smaller as the initial amount of water is smaller.

I have found that it is advantageous to obtain such solutions by an electrolytic process, comprising electrolyzing a sodium chloride brine in two stages. The first stage is carried out in electrolyzers which have no diaphragm and which have a magnetite or graphite anode and is continued until a residuary NaCl content not lower than 70 g./l. is reached. The second stage is performed in electrolyzers which have platinized metal or platinum anodes and is continued until a NaCl content between 10% and 3% of the final chlorate content is reached. Preferably, to the solution under treatment is added crystallized sodium chloride to increase the final concentration.

The starting material is an NaCl brine as concentrated as possible, its concentration being between 280 g./l. and saturation. 1 to 10 g./l. of an alkali metal dichromate or chromate, preferably 2 to 5 g./l., are usually added to the solution to reduce the cathodic reduction phenomena and to increase electrolytic current efficiency. This brine is electrolyzed according to any of the well-known processes, in cells which have no diaphragm and which have magnetite or graphite anodes, and graphite, cast iron or steel cathodes. The electrolysis is executed either in electrolyzers in series or in electrolyzers hydraulically connected in parallel and recycling of a part of the final product therethrough is optional.

According to the invention, the electrolysis of the first stage is stopped when the solution under treatment titrates, according to the initial concentration of the brine and the exact point on which it is deemed advisable to stop it, 370 to 560 g./l. $NaClO_3$ and 120 to 70 g./l. NaCl, preferably 100 g./l. Should the electrolysis be continued in such cells, so that the NaCl content becomes lower than these latter concentrations, the wear of the anodes is excessive for an economical operation.

The densities of electric current employed in the process of the invention may be those which are used in known processes for electrolyzing sodium chloride, comprised between about 2 and 8 a./dm.² in the case of graphite or magnetite anodes, about 15 and 40 a./dm.² in the case of platinum anodes, about 3 and 20 a./dm.² in the case of platinized metal anodes. The cathodic densities used may be comprised between about 2 and 10 a./dm.². The temperatures employed in the process according to the invention are the same as those employed in known processes, comprised between 25 and 45° C. in the case of graphite anodes, 25 and 80° C. in the case of magnetite, platinum or platinized metal anodes.

The solution from the electrolysis cells which have no diaphragm is eventually recharged with NaCl and is then electrolyzed again in cells which have no diaphragm and which have platinized metal or platinum anodes, and cast iron or steel cathodes. The second stage electrolysis is continued until the NaCl equilibrium concentration compared to that of $NaClO_3$ is between 10 and 3%, and preferably about 5%.

If the starting brine is almost saturated with NaCl at the room temperature, and if no addition of NaCl is made during the successive operations, the final concentration will be in the vicinity of 600 g./l. $NaClO_3$, and preferably in the vicinity of 30 g./l. NaCl.

In the process of the invention, I prefer to obtain a solution as concentrated as possible in $NaClO_3$ and, to this end, I recharge the solution with solid NaCl. As soon as a part of NaCl is transformed into $NaClO_3$, it becomes possible to dissolve additional NaCl in the solution under treatment, even if the starting solution was saturated.

This addition of NaCl may be carried out during the first electrolysis, and thereby easily obtain 630 g./l. $NaClO_3$ for a NaCl concentration which is capable of being lowered to 70 g./l.

The addition of NaCl may also be effected between the two electrolysis stages, during the second electrolysis, or partly at any of the three points mentioned. The total quantity thus added may amount up to 33% of the initial quantity.

If an addition of NaCl is made, the final NaClO₃ concentration will be limited only by the solubility of the NaClO₃ at the chosen temperature, in the presence of the remaining quantity of NaCl. At 35° C. for example, the saturation of the composite solution is 700 g./l. NaClO₃ with a residuary concentration of 35 g./l. NaCl. At other temperatures and with other residuary concentrations of NaCl, the maximum concentration of NaClO₃ may have other values. Use of such highly concentrated solutions is favorable for ClO₂ production by the action of SO₂.

The NaCl employed may be a usual industrial salt which can be used without any prior purification and for the starting brine as well as for recharging the electrolytes.

Among the common impurities, the alkaline earth ions are removed from the electrolyte in the form of slurries formed during the electrolysis, while the ions SO₄ remain in the solution and do not obstruct formation of ClO₂ when the solution is subjected to the action of SO₂.

After subjection to the electrolyzers with the graphite or magnetite anodes, and before or after the second stage electrolytic treatment, the solution is carefully filtered to remove the solid impurities in suspension which result from degradation of the anodes. In particular, presence of traces of graphite in the ClO₂ reactor may cause explosions.

The process of the invention is attractive for production of ClO₂, because it permits utilization of several individual advantages of known processes, some of which employ solutions with a very high $$\frac{\text{chlorate}}{\text{NaCl}}$$

ratio obtained from solid chlorate, and others which employ solutions obtained from electrolysis with a lower $$\frac{\text{NaClO}_3}{\text{NaCl}}$$

ratio and thereby evolve gases wherein the $$\frac{\text{Cl}_2}{\text{ClO}_2}$$

ratio is relatively high.

The invention particularly procures the advantages of the processes which use highly concentrated chlorate solutions, because formation of solid chlorate is avoided; therefore, the expense of crystallization of solid chlorate is not incurred.

While I have described a preferred embodiment of my invention, it may be otherwise embodied within the scope of the appended claims.

I claim:
1. A method for preparing a concentrated sodium chlorate solution suitable for use in the manufacture of chlorine dioxide in a process using sulfur dioxide comprising:
    (A) preparing a sodium chloride solution having a concentration of at least 280 g./l.;
    (B) electrolyzing said solution until the sodium chloride concentration of said solution is between 70 and 120 g./l. using an anode selected from the group consisting of magnetite and graphite; and
    (C) again electrolyzing said solution using an anode selected from the group consisting of platinum and platinized metals until the sodium chloride concentration of said solution is between 3 and 10% of the sodium chlorate concentration in said solution and said sodium chlorate concentration is at least 600 g./l.

2. The method of claim 1 wherein both of said electrolyses are carried out in diaphragm-free electrolyzers.

3. The method of claim 1 wherein 1 to 10 g./l. of a compound selected from the group consisting of alkali metal chromates and alkali metal dichromates is added to said solution before both electrolyses.

4. The method of claim 3 wherein the amount of said compound added is 2 to 5 g./l.

5. The method of claim 1 wherein additional sodium chloride in an amount up to 33% of the initial amount of sodium chloride is added to said solution between the beginning of the electrolysis of step B and the end of the electrolysis of step C.

6. The process of claim 1 wherein the solution is electrolyzed under step B until the sodium chloride concentration is 100 g./l. and the solution is electrolyzed under step C until the sodium chloride concentration is 5% of the sodium chlorate concentration in said solution.

7. The process of claim 1 wherein said solution is filtered after step B.

References Cited

UNITED STATES PATENTS

| | | | |
|---|---|---|---|
| 2,731,325 | 1/1956 | Kesting | 204—95 |
| 2,756,201 | 7/1956 | Muller | 204—95 |
| 2,813,825 | 11/1957 | Miller et al. | 204—95 |
| 3,043,757 | 7/1962 | Holmes | 204—95 |
| 587,437 | 8/1897 | Hurter | 204—268 |
| 553,465 | 1/1896 | Hermite | 204—269 |

FOREIGN PATENTS

| | | |
|---|---|---|
| 644,318 | 10/1950 | Great Britain. |
| 28,353 | 1902 | Great Britain. |

OTHER REFERENCES

Mantell, C. L.: Electrochemical Engineering, 4th Edition, New York, 1960, McGraw-Hill, pp. 342 to 345.

HOWARD S. WILLIAMS, *Primary Examiner.*

H. M. FLOURNOY, *Assistant Examiner.*